United States Patent
Sugiyama et al.

(10) Patent No.: US 12,512,188 B2
(45) Date of Patent: Dec. 30, 2025

(54) CLINICAL SUPPORT SYSTEM AND CLINICAL SUPPORT APPARATUS

(71) Applicant: CANON MEDICAL SYSTEMS CORPORATION, Otawara (JP)

(72) Inventors: Atsuko Sugiyama, Nasushiobara (JP); Kei Mori, Shioya (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 297 days.

(21) Appl. No.: 18/176,040

(22) Filed: Feb. 28, 2023

(65) Prior Publication Data

US 2024/0290441 A1    Aug. 29, 2024

(51) Int. Cl.
*G16H 10/20* (2018.01)

(52) U.S. Cl.
CPC .................... *G16H 10/20* (2018.01)

(58) Field of Classification Search
CPC ........ G16H 10/20; G16H 10/60; G16H 40/20; G16H 80/00
See application file for complete search history.

(56) References Cited

U.S. PATENT DOCUMENTS

| | | | | |
|---|---|---|---|---|
| 2004/0093238 A1* | 5/2004 | Deakter | ............. | G06Q 30/0283 705/400 |
| 2007/0106531 A1* | 5/2007 | Deakter | ................. | G06Q 10/10 705/2 |

(Continued)

FOREIGN PATENT DOCUMENTS

| | | |
|---|---|---|
| JP | 2014-503894 A | 2/2014 |
| JP | 2016-91226 A | 5/2016 |
| JP | 2023-115924 A | 8/2023 |

OTHER PUBLICATIONS

Rosland AM, Piette JD, Trivedi R, Kerr EA, Stoll S, Tremblay A, Heisler M. Engaging family supporters of adult patients with diabetes to improve clinical and patient-centered outcomes: study protocol for a randomized controlled trial. Trials. Jul. 24, 2018; 19(1):394. doi:10.1186/s13063-018-2785-2. PMID: (Year: 2018).*

(Continued)

*Primary Examiner* — Sun M Li
(74) *Attorney, Agent, or Firm* — Oblon, McClelland, Maier & Neustadt, L.L.P.

(57) ABSTRACT

A clinical support system according to an embodiment includes a clinical support apparatus, which is provided with processing circuitry, and a display device. The processing circuitry configured to acquire patient information related to a patient, interview information showing a response detail of the patient with respect to an interview, and conversation information recording a conversation of the patient; generate patient characteristic information showing a mental aspect and a social aspect of the patient by an analyzing process using the patient information, the interview information, and the conversation information; and determine at least one supporter, who is to be requested for the support, based on the patient characteristic information, a medical-practice event of the patient, and a request condition for requesting support in the medical-practice event. The display device displays a screen including information related to the determined supporter.

16 Claims, 9 Drawing Sheets

(56) References Cited

U.S. PATENT DOCUMENTS

| | | | | |
|---|---|---|---|---|
| 2007/0179803 | A1* | 8/2007 | Abraham-Fuchs | G16H 10/20 600/300 |
| 2008/0195600 | A1* | 8/2008 | Deakter | G16H 70/20 707/999.005 |
| 2013/0268547 | A1 | 10/2013 | Boroczky et al. | |
| 2014/0310015 | A1* | 10/2014 | Goldner | G16H 10/20 705/2 |
| 2017/0124260 | A1* | 5/2017 | Mcaneny | G06Q 40/08 |
| 2018/0357220 | A1* | 12/2018 | Galitsky | G06F 40/30 |
| 2021/0110895 | A1* | 4/2021 | Shriberg | G16H 10/20 |
| 2022/0114213 | A1 | 4/2022 | Boroczky et al. | |
| 2022/0157412 | A1* | 5/2022 | Ikeda | G16H 40/20 |
| 2023/0017196 | A1* | 1/2023 | Jain | H04L 67/01 |
| 2023/0224540 | A1* | 7/2023 | Kodali | G06Q 40/03 725/34 |

OTHER PUBLICATIONS

L. A. S. M. Gunathilaka, W. A. U. S. Weerasinghe, I. N. Wickramasinghe, V. Welgama and A. R. Weerasinghe, "The Use of Conversational Interfaces in Long Term Patient Care," 2020 20th International Conference on Advances in ICT for Emerging Regions (ICTer), Colombo, Sri Lanka, 2020, pp. 131-136, doi: 10. (Year: 2020).*

Yoo DW, Ernala SK, Saket B, Weir D, Arenare E, Ali AF, Van Meter AR, Birnbaum ML, Abowd GD, De Choudhury M. Clinician Perspectives on Using Computational Mental Health Insights From Patients' Social Media Activities: Design and Qualitative Evaluation of a Prototype.JMIR Ment Health. Nov. 16, 2021;8(11): (Year: 2021).*

Barak LC, Kuijpers G, Hoeijmakers L, Scheele F. Learning from the implementation of clinical empathy training: an explorative qualitative study in search of the barriers and facilitators. BMC Med Educ. Nov. 23, 2022;22(1):806. doi: 10.1186/s12909-022-03877-8. PMID: 36419055; PMCID: PMC9685956. (Year: 2022).*

Damen DJ, Schoonman GG, Maat B, Habibović M, Krahmer E, Pauws S. Patients Managing Their Medical Data in Personal Electronic Health Records: Scoping Review. J Med Internet Res. Dec. 27, 2022;24(12):e37783. doi: 10.2196/37783. PMID: 36574275; PMCID: PMC9832357. (Year: 2022).*

"AI for Medical Conversations," Abridge, Retrieved from the Internet [URL: https://www.abridge.com/], 2022, 5 pages.

"Training entity extraction models for healthcare," Google Cloud, Retrieved from the Internet [URL: https://cloud.google.com/natural-language/automl/docs/automl-healthcare?6598], Oct. 26, 2022, 6 pages.

"How Mount Sinai is using AI to unlock social determinant data in the EHR," Healthcare IT News, Retrieved from the Internet [URL: https://www.healthcareitnews.com/news/how-mount-sinai-using-ai-unlock-social-determinant-data-ehr], Jun. 17, 2019, 13 pages.

"Analyzing Sentiment," Google Cloud, Retrieved from the Internet [URL: https://cloud.google.com/natural-language/docs/analyzing-sentiment], Oct. 27, 2022, 3 pages.

"Analyze insights in text with Amazon Comprehend, How-To Guide," AWS, Retrieved from the Internet [URL: https://aws.amazon.com/jp/getting-started/hands-on/analyze-sentiment-comprehend/], May 16, 2022, 11 pages.

Japanese Office Action issued Apr. 16, 2024 in Japanese Application 2023-030123, 2 pages.

* cited by examiner

| CATEGORIES | ANALYSIS ITEMS | ANALYSIS TARGET ITEMS |
|---|---|---|
| BIOLOGICAL ASPECTS | COEXISTING CONDITIONS | ☑ |
| | PHYSICAL SHAPE | ☐ |
| MENTAL ASPECTS | LIMITED-LIFE-EXPECTANCY INFORMING | ☑ |
| | PREFERENCES OF TREATMENT | ☑ |
| | PERSONALITY | ☑ |
| SOCIAL ASPECTS | RELATIONSHIPS | ☐ |
| | SUBSTANCES OF WORK | ☑ |
| | HOBBIES | ☑ |
| | EDUCATIONAL BACKGROUND | ☐ |
| OTHERS | | ☐ |

| MEDICAL-PRACTICE EVENTS | IMPORTANCE DEGREES |
|---|---|
| FIRST VISIT | 1 |
| DISCLOSURE | 3 |
| EXTENSIVE TESTING | 1 |
| TREATMENT START | 1 |
| TREATMENT UNDERWAY | 1 |
| MEDICATION CHANGE | 2 |
| TREATMENT END | 1 |
| TREATMENT CANCELLATION | 2 |
| TERMINAL PHASE | 3 |

| MEDICAL-PRACTIC EVENTS | REQUEST CONDITIONS | SPECIALISTS | PRIORITIES |
|---|---|---|---|
| TREATMENT UNDERWAY | CONDITION CHANGED | GENETIC COUNSELOR | 3 |
| | | CLINICAL GENETICIST | 3 |
| | | CANCER NURSE | 1 |
| | | CANCER-COUNSELING-ROOM SPECIALIST | 1 |
| | DEPRESSIVE STATE | PALLIATIVE CARE DOCTOR | 3 |
| | | PSYCHO-ONCOLOGIST | 3 |
| | | SOCIAL WORKER | 2 |
| | | CANCER NURSE | 1 |
| | | CANCER-COUNSELING-ROOM SPECIALIST | 2 |

FIG.6

| DATE | JULY 11th (SAT) | JULY 12th (SUN) | JULY 13th (MON) | JULY 14th (TUE) | JULY 15th (WED) | JULY 16th (THU) |
|---|---|---|---|---|---|---|
| MEDICAL-PRACTICE EVENT | | MEDICAL PRACTICE APPOINT-MENT | | MEDICAL ATTENTION APPOINT-MENT | | MEDICAL ATTENTION APPOINT-MENT |
| | | FIRST VISIT | | EXTENSIVE TESTING | | DISCLO-SURE |

NAME: AAAA
DATE OF BIRTH: JULY 15th, 2021 (42 YEARS AND 9 MONTHS)
BLOOD TYPE: TYPE A Rh+ BODY HEIGHT: 165.4 cm BODY WEIGHT: 72.1 kg

JULY 16th IS DISCLOSURE DAY
☑ OUTPATIENT NURSE
☐ PSYCHO-ONCOLOGIST
☐ CANCER COUNSELING ROOM

SUPPORT ASKING

SUPPORTER REQUEST

| VITAL SIGNS | |
|---|---|
| PULSE | BLOOD PRESSURE |
| 210 | 150 |
| 160 | 120 |
| 110 | 90 |
| 60 | 30 |

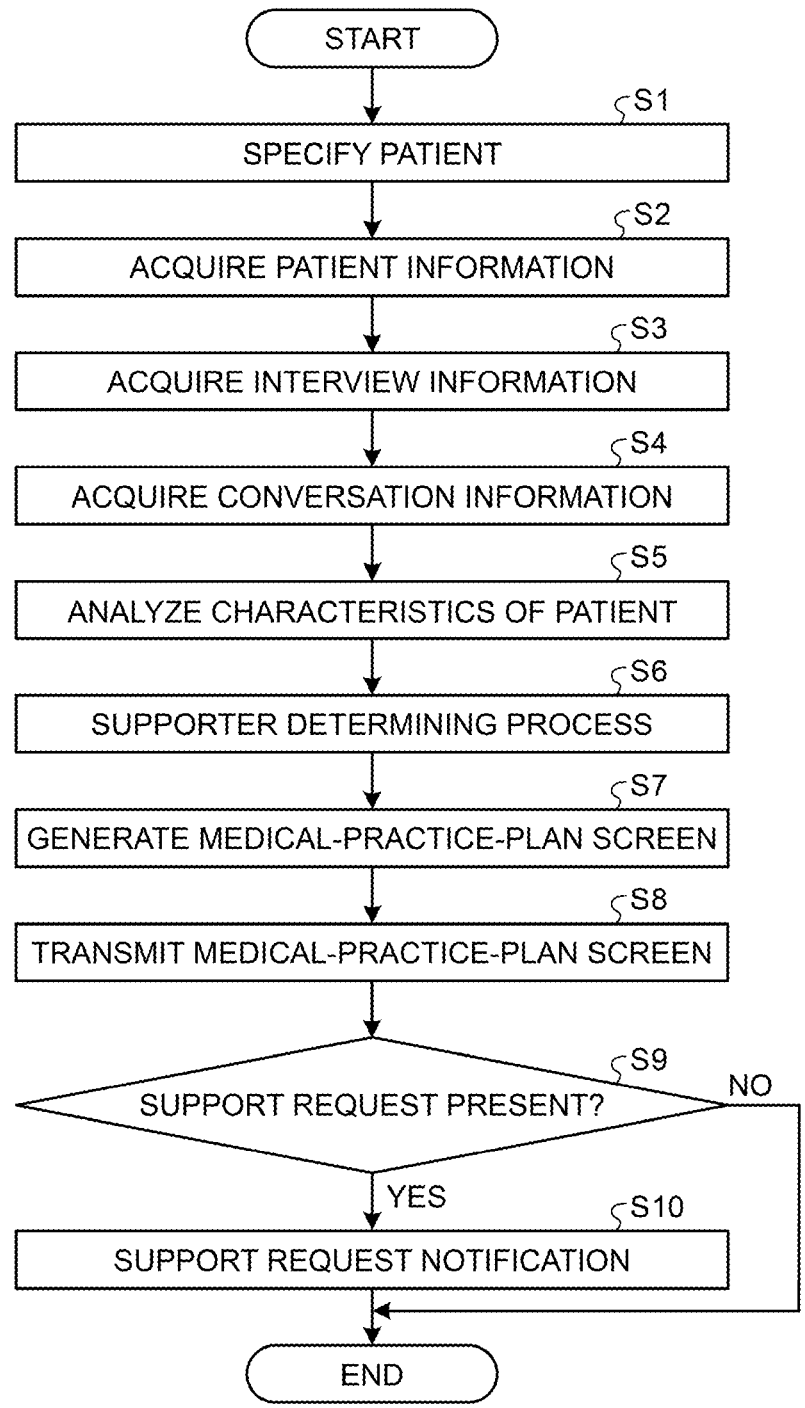

CLINICAL SUPPORT SYSTEM AND CLINICAL SUPPORT APPARATUS

FIELD

Embodiments described herein relate generally to a clinical support system and a clinical support apparatus.

BACKGROUND

One of the problems to be solved by embodiments disclosed in the present specification and drawings is to support the determination whether to request a specialist (s) for support or not. However, the problems to be solved by the embodiments disclosed in the present specification and drawings are not limited to the above described problems. Problems corresponding to effects of configurations shown in the later-described embodiments may be regarded as other problems.

BRIEF DESCRIPTION OF THE DRAWINGS

FIG. 3 is a diagram illustrating an example of a data configuration of analysis target information;

FIG. 4 is a diagram illustrating an example of a data configuration of medical-practice-event information;

FIG. 5 is a diagram illustrating an example of a data configuration of support request information;

FIG. 6 is an explanatory diagram illustrating an example of a medical-practice-plan screen according to the embodiment;

FIG. 7 is a flow chart illustrating an example of a support requesting process executed by the clinical support apparatus according to the embodiment;

DETAILED DESCRIPTION

Figure 1:
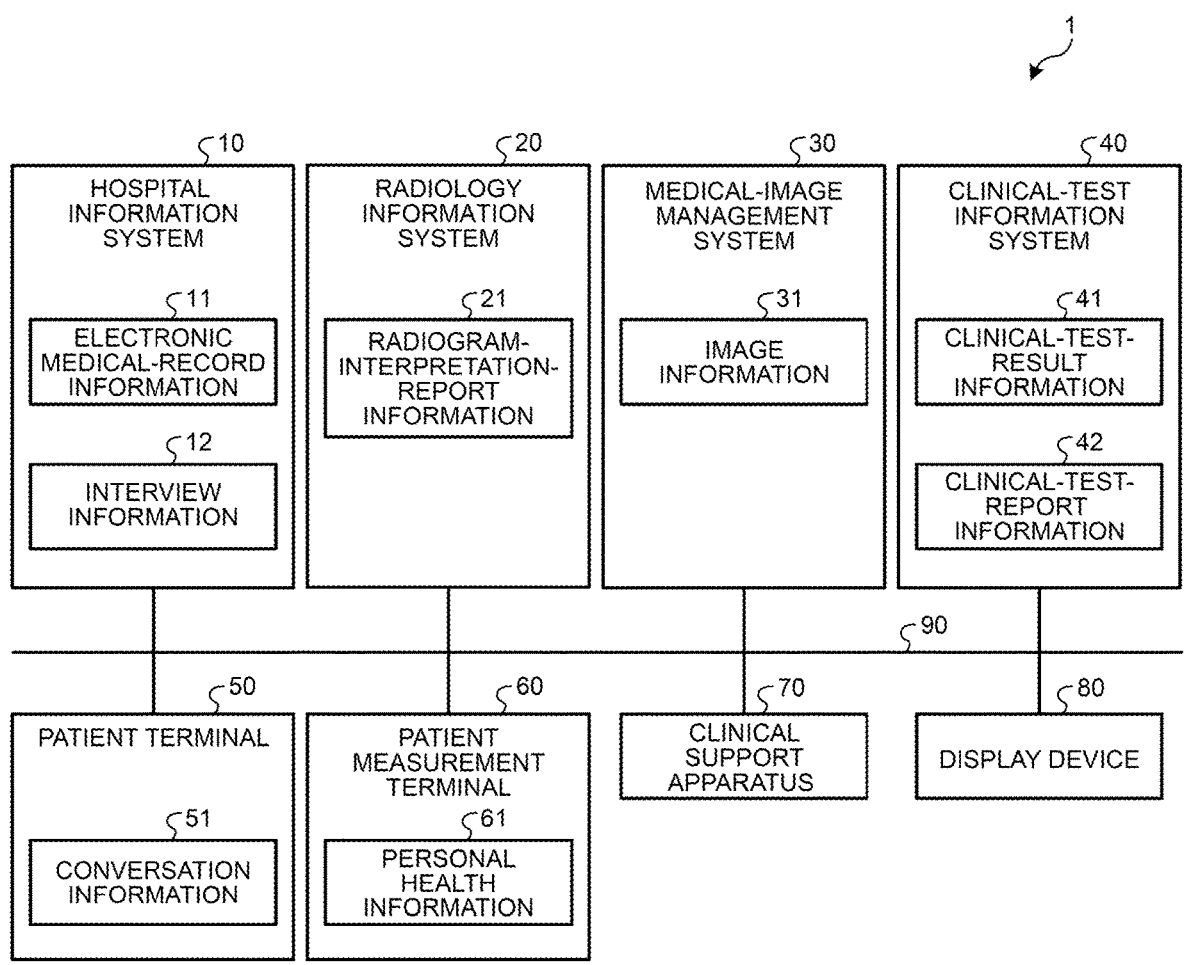
FIG. 1 is a block diagram illustrating an example of a configuration of a clinical support system according to a present embodiment.

Hereinafter, with reference to the drawings, a clinical support system and a clinical support apparatus related to the present embodiment will be described. In the following embodiment, the parts denoted by the same reference signs are assumed to carry out similar operation, and redundant description thereof will be appropriately omitted.

Present Embodiment

Medical workers such as doctors are required to carry out holistic medical care based on mental aspects and social aspects of patients in addition to biological aspects. In more detail, the medical workers are required to determine medical practice policies also in consideration of various aspects instead of determining medical practice policies only by biological aspects such as results of image diagnosis and results of clinical tests.

For example, patients with chronical conditions such as lifestyle-related diseases may not be able to heal only by the treatment of medication administration from biological aspects. For example, in a case of backache, the medical workers are preferred to give advice depending on the lifestyles and substances of work of patients in addition to prescription of a poultice.

When the medical workers carry out medical practices that encourage improvement in lifestyles, further improvement can be expected than the treatment that is only with medication administration. When the medical practice policies are determined also in consideration of whether the patient is with or without a child (children) and of the state of work, adherence (the extent that the patient is actively involved with treatment and medication and receives treatment in accordance with that determination) is improved during the treatment and after the treatment, and the patient can practice a better lifestyle and obtain a better outcome. Furthermore, since informing and treatment corresponding to the personality of the patient himself/herself is carried out, the patient can comfortably focus on the treatment.

In this manner, when the medical workers determine medical practice policies based on the biological aspects, the mental aspects, and the social aspects, the medical workers can provide better medical care. Therefore, the medical workers are required to provide so-called holistic medical care which also takes the mental aspects and the social aspects into consideration in addition to the biological aspects. Accordingly, the medical workers collect information related to the mental aspects and the social aspects by communicating with patients.

However, the medical workers communicate with the patients based on self-efforts and experiences. Also, it is sometimes difficult for the medical workers to collect the information related to the mental aspects and the social aspects. The medical workers also have to decide which information is to be recorded in electronic medical records or the like among the information related to the mental aspects and the social aspects. Furthermore, the medical workers are required to utilize the information from a higher perspective.

Also, in recent years, treatment is not carried out only by doctors, but medical care is provided together with various specialists. The medical workers such as doctors request support depending on the phase of medical practice and the state of patients. As a result, each specialist acts depending on his/her specialty. For example, social workers provide consultation about the lifestyles of patients. Also, cancer nurses carry out the care which is suitable for cancer medical care.

In this manner, the medical workers need to request support depending on the phase of medical practice and the state of patients. However, it is sometimes difficult for the medical workers to determine at which timing to request support from which specialist. Therefore, techniques that support the determination whether to request support from specialists or not are required.

FIG. 1 is a block diagram illustrating an example of a configuration of a clinical support system 1 according to the present embodiment. The clinical support system 1 is provided with: a hospital information system (HIS: Hospital Information System) 10, a radiology information system (RIS: Radiology Information Systems) 20, a medical-image management system (PACS: Picture Archiving and Communication Systems) 30, a clinical-test information system (LIS: Laboratory Information System) 40, a patient terminal 50, a patient measurement terminal 60, a clinical support apparatus 70, and a display device 80. The systems and devices are communicably connected mutually via a network 90. Note that the configuration illustrated in FIG. 1 is an example, and the number of the systems and the devices may be arbitrary changed. Also, a device (s) not illustrated in FIG. 1 may be connected to the network 90.

The hospital information system 10, the radiology information system 20, the medical-image management system 30, and the clinical-test information system 40 are realized, for example, by computer equipment such as servers or workstations.

The hospital information system 10 stores electronic medical-record information 11 and interview information 12. The electronic medical-record information 11 is the information which records the courses of medical practice of patients. For example, the electronic medical-record information 11 has information such as the information for identifying the patients, personal information such as age, gender, and family members of the patients, the names of diseases of the patients, the names of prescribed medication, and periods of treatment. The interview information 12 is the information showing response details of the patients with respect to the interviews. For example, the interview information 12 has responses to the current symptoms of the patients, responses to the lifestyle environments of the patients, and responses to the personality diagnosis of the patients.

The radiology information system 20 stores radiogram-interpretation-report information 21. The radiogram-interpretation-report information 21 is the information which has opinions of doctors or the like who carried out the radiogram interpretation of image information 31 captured by medical image diagnosis apparatus.

The medical-image management system 30 stores the image information 31. The image information 31 has images captured by the medical image diagnosis apparatus. Examples of the medical image diagnosis apparatus include apparatus such as X-ray Computed Tomography (CT) apparatus, Magnetic Resonance Imaging (MRI) apparatus, X-ray diagnosis apparatus, and ultrasonic-wave diagnosis apparatus. The image information 31 follows the standard of Digital Imaging and Communications in Medicine (DICOM).

The clinical-test information system 40 stores clinical-test-result information 41 and clinical-test-report information 42. The clinical-test-result information 41 is the information showing the results of clinical tests. The clinical-test-report information 42 is the information which has opinions with respect to the clinical test results.

The patient terminal 50 is a terminal used by the patient. The patient terminal 50 is realized, for example, by a smartphone, a tablet terminal, a wearable terminal, or a personal computer. The patient terminal 50 stores conversation information 51 in which conversations of the patient are recorded. For example, the conversation information 51 is the information of the conversations between medical workers such as doctors, nurses, and counselors and the patient. The conversation information 51 is not limited to the conversations related to medical practice details, but may include small talk. Specifically, the conversation information 51 has sound information which has recorded the conversations or the information which has transcribed the sound. The conversation information 51 may have video information such as moving images and still images including the conversations. If the video image is included, the conversation information 51 has a video which shows facial expressions of the patient.

The patient measurement terminal 60 is a terminal which measures vital signs of the patient. The patient measurement terminal 60 is realized, for example, by a wearable terminal. The patient measurement terminal 60 measures vital signs such as blood pressure, pulse, body temperature, and breathing. Also, the patient measurement terminal 60 may record conversations. The patient measurement terminal 60 stores personal health information 61 which has the measurement results of the vital signs.

Note that the patient measurement terminal 60 is not limited to a wearable terminal, but may be a body fat scale, an activity amount meter, or another device. Also, the patient measurement terminal 60 may measure body fat, may measure the amount of activity, or may measure another matter. Furthermore, the clinical support system 1 may be provided with plural patient measurement terminals 60. Also, in the clinical support system 1, the plural patient measurement terminals 60 may each have different measurement targets.

The clinical support apparatus 70 is a device which supports medical workers such as doctors in clinical practice. The clinical support apparatus 70 is realized, for example, by computer equipment such as a server or a workstation. The clinical support apparatus 70 analyzes the biological aspects, social aspects, and mental aspects of the patient based on the information acquired from the systems or devices of the clinical support system 1. Also, the clinical support apparatus 70 analyzes, as other aspects, the information not belonging to the biological aspects, the social aspects, or the mental aspects of the patient. Also, the clinical support apparatus 70 generates the information which shows the biological aspects, the social aspects, the mental aspects, and the other aspects of the patient. The clinical support apparatus 70 may be installed in a facility or may be a server on the Internet.

The display device 80 is a device which can display various information. The display device 80 is realized by computer equipment such as a personal computer or a tablet terminal. The display device 80 displays various information generated by the clinical support apparatus 70. For example, the display device 80 displays a medical-practice-plan screen G1 (see FIG. 6). The display device 80 is an example of a display control unit.

Therefore, medical workers such as doctors can determine whether to request support from specialists or not by checking the information displayed on the display device 80.

Next, the clinical support apparatus 70 will be described.

Figure 2:
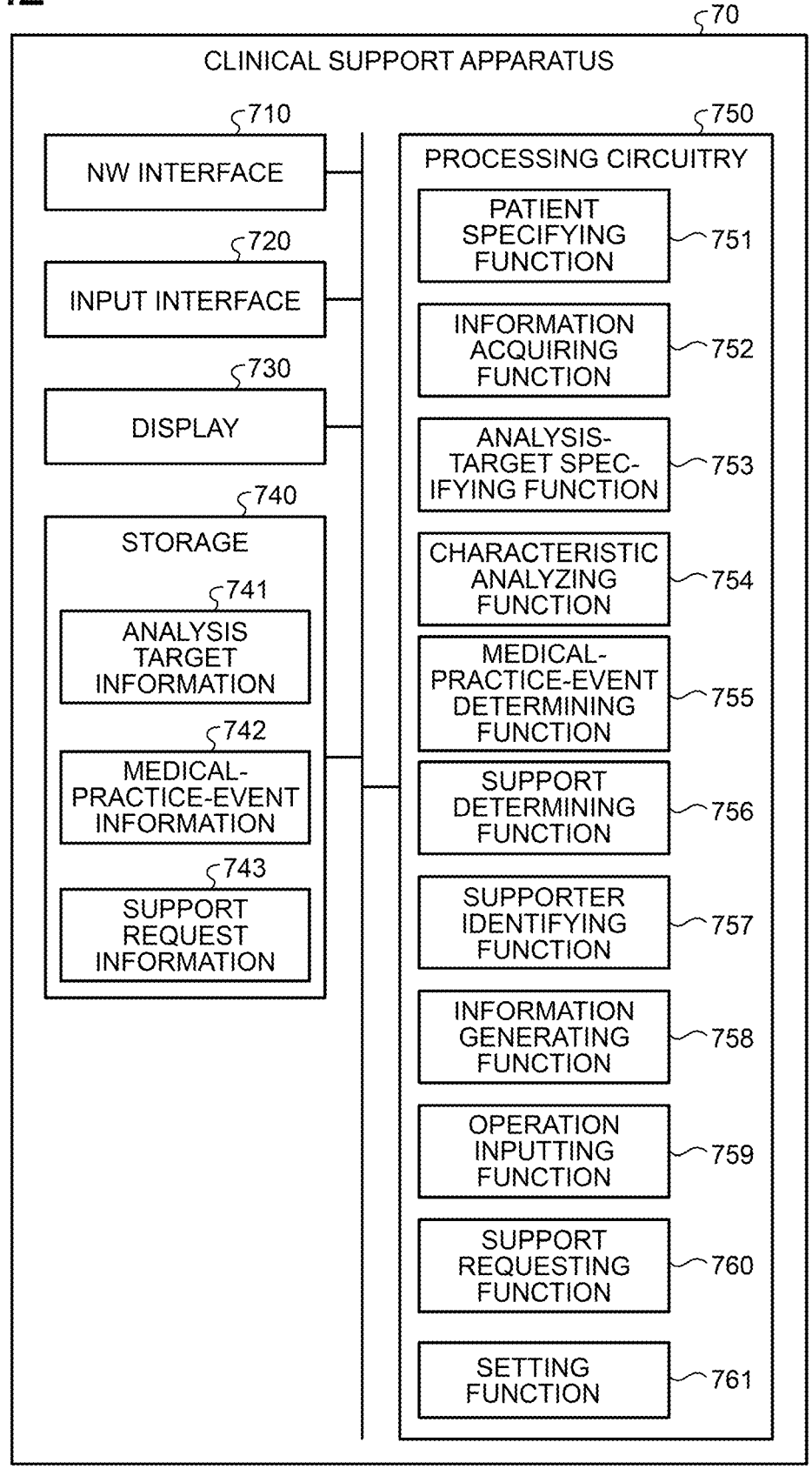
FIG. 2 is a block diagram illustrating an example of a configuration of a clinical support apparatus according to the present embodiment.

FIG. 2 is a block diagram illustrating an example of the configuration of the clinical support apparatus 70 according to the present embodiment. The clinical support apparatus 70 has a network (NW) interface 710, an input interface 720, a display 730, a storage 740, and processing circuitry 750.

The NW interface 710 is connected to the processing circuitry 750 and controls transmission and communication of various data carried out with the devices connected via the network 90. For example, the NW interface 710 is realized by a network card, a network adapter, a Network Interface Controller (NIC), or the like.

The input interface 720 is connected to the processing circuitry 750, converts input operations which have been received from an operator (medical worker) to electric signals, and outputs the electric signals to the processing circuitry 750. Specifically, the input interface 720 converts the input operations, which have been received from the operator, to electric signals and outputs the electric signals to the processing circuitry 750. For example, the input interface 720 is realized by a trackball, switch buttons, a mouse, a keyboard, a touch pad which carries out input operations when an operation surface is touched, a touch screen integrating a display screen and a touch pad, a non-contact input circuit using optical sensors, a sound input circuit, and so on. Note that, in the present specification, the input interface 720 is not limited to that with physical operating parts such as a mouse and a keyboard. For example, examples of the input interface 720 also include a data processing circuit of electric signals, which receives the electric signals corresponding to input operations from external input equipment provided separately from the device and outputs the electric signals to a control circuit.

The display 730 is connected to the processing circuitry 750 and displays various information and various image data output from the processing circuitry 750. For example, the display 730 is realized by a liquid-crystal display, a Cathode Ray Tube (CRT) display, an organic EL display, a plasma display, a touch panel, or the like.

The storage 740 is connected to the processing circuitry 750 and stores various data. Also, the storage 740 stores various programs for realizing various functions when the programs are read and executed by the processing circuitry 750. For example, the storage 740 is realized by a semiconductor memory element such as a Random Access Memory (RAM) and a flash memory, a hard disk, an optical disk, or the like.

The storage 740 stores analysis target information 741, medical-practice-event information 742, and support request information 743.

FIG. 3 is a diagram illustrating an example of a data configuration of the analysis target information 741. The analysis target information 741 is the information in which the targets to be analyzed as the biological aspects, the social aspects, the mental aspects, and the other aspects of the patient are specified among the information acquired by the systems and the devices of the clinical support system 1.

In the analysis target information 741, categories, analysis items, and analysis target items are mutually associated. The categories are classifications of the biological aspects, the mental aspects, the social aspects, and so on. The biological aspects are the category which shows biological aspects of the patient. For example, the biological aspects are associated with biological analysis items such as various test results, conditions, and physical shape of the patient. Also, the biological aspects are not limited to the biological aspects, but may be associated with analysis items related to physical aspects, medical aspects, and pathological aspects. The mental aspects are the category which shows the mental aspects of the patient. For example, the mental aspects are associated with analysis items of the mental aspects such as the will and personality of the patient. Also, the mental aspects may include the emotional state of the patient. The emotional state represents emotions such as a depressive tendency or a tendency to be upset. The mental aspects may include limited-life-expectancy informing which shows whether the patient wants to know limited life expectancy or not, preferences of treatment which show how the patient make choices on treatment, thoughts and values of the patient, the personality of the patient, and so on. The social aspects are the category which shows the social aspects of the patient. For example, the social aspects are associated with analysis items of social aspects such as work, relationships, hobbies, educational background, and so on. The others are associated with the analysis items which do not belong to any of the biological aspects, the mental aspects, and the social aspects. The analysis items are the items for analyzing the patient. The analysis target items are the information in which whether the analysis items are to be analyzed or not is set. More specifically, the clinical support apparatus 70 analyzes the analysis items which are set to be analyzed among the analysis target items. The associating of the categories and the analysis items of the analysis target information 741 illustrated in FIG. 3 is an example and may be arbitrarily changed.

FIG. 4 is a diagram illustrating an example of a data configuration of the medical-practice-event information 742. The medical-practice-event information 742 is the information in which medical-practice events and importance degrees of the medical-practice events are mutually associated. The medical-practice events are events in medical practice. The importance degrees are the information showing the degrees for prioritizing the medical-practice events among the medical-practice events. The medical-practice events illustrated in FIG. 4 are examples, and any events may serve as medical-practice events. More specifically, as the medical-practice events, medical-practice events which are not in the medical-practice-event information 742 illustrated in FIG. 4 may be added, or the medical-practice event (s) in the medical-practice-event information 742 illustrated in FIG. 4 may be removed. Also, the importance degrees illustrated in FIG. 4 are examples and may be arbitrarily changed. Note that the medical-practice-event information 742 is not required to have the importance degrees.

FIG. 5 is a diagram illustrating an example of a data configuration of the support request information 743. The support request information 743 is the information which has a list of specialists who carry out support when request conditions are satisfied in the medical-practice events. Also, FIG. 5 illustrates part of the support request information 743. More specifically, the support request information 743 has information of other medical-practice events in addition to the medical-practice events of "TREATMENT UNDERWAY". Also, the support request information 743 illustrated in FIG. 5 illustrates that, when the request condition "CONDITION CHANGED" is satisfied in the medical-practice event "TREATMENT UNDERWAY", the specialists associated with the request condition "CONDITION CHANGED" become supporter candidates. Also, the information showing specialists is associated with priorities. The priorities show the degrees of necessity to request support from the associated specialists. Also, the clinical support apparatus 70 displays a list of the specialists based on the priorities. By virtue of this, the clinical support apparatus 70 facilitates the request to the more important specialists. Also, the request conditions, the specialists, and the priorities illustrated in FIG. 5 are examples and may be arbitrarily changed. Note that the support request information 743 is not required to have the priorities.

The processing circuitry 750 controls overall operation of the clinical support apparatus 70. The processing circuitry 750 has, for example, a patient specifying function 751, an information acquiring function 752, an analysis-target specifying function 753, a characteristic analyzing function 754, a medical-practice-event determining function 755, a support determining function 756, a supporter identifying function 757, an information generating function 758, an operation inputting function 759, a support requesting function 760, and a setting function 761. In the embodiment, processing functions carried out by the patient specifying function 751, the information acquiring function 752, the analysis-target specifying function 753, the characteristic analyzing function 754, the medical-practice-event determining function 755, the support determining function 756, the supporter identifying function 757, the information generating function 758, the operation inputting function 759, the support requesting function 760, and the setting function 761 which are constituent elements are stored in the storage 740 in the form of computer-executable programs. The processing circuitry 750 is a processor which realizes the functions corresponding to the programs by reading the programs from the storage 740 and executing the programs. In other words, the processing circuitry 750 in the state that the programs have been read have the functions illustrated in the processing circuitry 750 of FIG. 2.

Note that it has been described that, in FIG. 2, the single processor realizes the patient specifying function 751, the information acquiring function 752, the analysis-target specifying function 753, the characteristic analyzing function 754, the medical-practice-event determining function 755, the support determining function 756, the supporter identifying function 757, the information generating function 758, the operation inputting function 759, the support requesting function 760, and the setting function 761. However, the functions may be realized by combining plural independent processors to build the processing circuitry 750 and executing the programs by the processors. Also, it has been described that, in FIG. 2, the single storage circuit such as the storage 740 stores the programs corresponding to the processing functions. However, plural storage circuits may be dispersedly disposed, and the processing circuitry 750 may be configured to read the programs from the individual corresponding storage circuits.

The word "processors" used in the above description means, for example, circuits such as Central Processing Units (CPUs), Graphical Processing Units (GPUS), Applications Specific Integrated Circuits (ASICs), programmable logic devices (for example, Simple Programmable Logic Devices: SPLDs), Complex Programmable Logic Devices: CPLDs), Field Programmable Gate Arrays (FPGAs), and so on. The processor (s) realizes the functions by reading and executing the programs saved in the storage 740. Note that, instead of saving the programs in the storage 740, the programs may be configured to be directly embedded in the circuit of the processor. In such a case, the processor realizes the functions by reading and executing the programs embedded in the circuit.

The patient specifying function 751 receives specifying of the patient who is the target for creating treatment policies. In other words, the patient specifying function 751 receives specifying of the patient who is the target for analyzing the biological aspects, the social aspects, and the mental aspects of the patient. The patient specifying function 751, for example, receives specifying of the patient from the display device 80. For example, the patient specifying function 751 receives the information which enables identifying of the patient such as the name of the patient and a patient code for distinguishing the patient. Also, when a choice is made from a list of patients, the patient specifying function 751 receives specifying of the patient.

The information acquiring function 752 acquires patient information related to the patient, the interview information 12 showing the response details of the patient with respect to interviews, and the conversation information 51 in which the conversations of the patient are recorded. The information acquiring function 752 is an example of an acquisition unit. Herein, the patient information is the information obtained by monitoring the patient such as the electronic medical-record information 11, the radiogram-interpretation-report information 21, the image information 31, the clinical-test-result information 41, the clinical-test-report information 42, and the personal health information 61. For example, when the patient is specified by the patient specifying function 751, the information acquiring function 752 acquires the patient information, the interview information 12, and the conversation information 51 of the specified patient.

The analysis-target specifying function 753 specifies the analysis target items which are the target analysis items to be analyzed by the characteristic analyzing function 754 among the analysis items of the biological aspects, the mental aspects, and the social aspects of the patient. In other words, the analysis-target specifying function 753 specifies the analysis target items of the analysis target information 741.

In more detail, the analysis-target specifying function 753 receives specifying of the analysis targets to be analyzed by using the patient information, the interview information 12, and the conversation information 51 acquired by the information acquiring function 752. For example, the analysis-target specifying function 753 receives specifying of the analysis targets by the information received by the NW interface 710 or by operation received by the input interface 720. For example, the analysis-target specifying function 753 receives specifying of the analysis targets from the display device 80 via the NW interface 710. Then, the analysis-target specifying function 753 specifies the analysis target items of the specified analysis target information 741 as analysis targets.

The characteristic analyzing function 754 generates patient characteristic information, which shows the biological aspects, the mental aspects, the social aspects, and the other aspects of the patient, by an analyzing process using the patient information, the interview information 12, and the conversation information 51. The characteristic analyzing function 754 is an example of an analysis unit. The analyzing process is a process of subjecting the patient information, the interview information 12, and the conversation information 51 to information extraction, determination, analysis, and generation of new information. The patient characteristic information is the information which shows characteristics of the patient in the biological aspects, the mental aspects, the social aspects, or the other aspects. Also, the patient characteristic information is the analysis results with respect to the analysis items of the biological aspects, the mental aspects, the social aspects, or the other aspects of the patient.

In more detail, the characteristic analyzing function 754 generates the patient characteristic information of the analysis target items of each of the biological aspects, the mental aspects, and the social aspects of the patient. The characteristic analyzing function 754 generates the patient characteristic information corresponding to the analysis target items of the biological aspect specified by the analysis target information 741 among the information included in the patient information. Specifically, the characteristic analyzing function 754 generates the patient characteristic information which shows coexisting conditions, physical shape, etc. included in the patient information.

Also, the characteristic analyzing function 754 generates the patient characteristic information of the analysis target items of the mental aspects and the social aspects specified by the analysis target information 741 among the information included in the patient information, the interview information 12, and the conversation information 51. For example, the characteristic analyzing function 754 generates the patient characteristic information corresponding to the analysis target items of the mental aspects and the social aspects specified by the analysis target information 741 among the interview information 12. Specifically, the characteristic analyzing function 754 extracts the responses to questions about personality determination, work, relationships, etc. included in the interview information 12.

Also, the characteristic analyzing function 754 generates the patient characteristic information including conversation detail information and emotion information of the conversations by analyzing the conversation information 51. The conversation detail information is the information which shows the details of the conversations. The emotion information is the information which shows the emotion of the patient when words in the conversations were spoken.

In more detail, the characteristic analyzing function 754 generates the patient characteristic information which includes the conversation detail information and the emotion information corresponding to the analysis target items of the mental aspects and the social aspects specified by the analysis target information 741. For example, the characteristic analyzing function 754 generates the conversation detail information which shows the details of the conversations by executing natural language processing with respect to the conversation information 51. For example, if the conversation information 51 includes a speech "I have a backache", the characteristic analyzing function 754 generates a text "I have a backache".

Also, the characteristic analyzing function 754 generates the emotion information which shows the emotions of the speaker patient. In this process, if the symptoms are getting worse, the patient often speaks with negative emotions. On the other hand, if the symptoms are improving, the patient often speaks with positive emotions. For example, the characteristic analyzing function 754 generates the emotion information which shows the emotions of the patient expressed by, for example, the tone of the voice, a falter, and nuance in the speech "I have a backache". In this manner, the characteristic analyzing function 754 generates the patient characteristic information in which the conversation detail information is associated with the emotion information.

For example, the characteristic analyzing function 754 may utilize artificial intelligence such as AI (Artificial Intelligence). For example, the characteristic analyzing function 754 generates the emotion information, which shows the emotions of the speaker of the conversations included in the conversation information 51, by a learned model generated by machine learning. The learned model is generated by supervised learning in which the conversation information 51 is input as input-side training data, and the emotion information which shows the emotions of speakers is input as output-side training data. Note that the learned model is not limited to be generated by such machine learning, but may be generated by another method.

Also, the characteristic analyzing function 754 may generate the information which shows the emotion information and values of the patient, by comparing the conversation information 51 with other information such as the patient information or the interview information 12. For example, if there is a response in the interview information 12 that he/she has a non-sedentary job of middle intensity, and if there is a response in the conversation information 51 that he/she has a non-sedentary job of 6 hours, the characteristic analyzing function 754 can generate the information that shows the values of the patient that the patient recognizes 6 hours as middle intensity.

Also, as time elapses, social circumstances and mental circumstances of the patient change. Therefore, the characteristic analyzing function 754 may generate the patient characteristic information in every certain period or may generate the patient characteristic information for every medical-practice event such as a test or disclosure.

Note that the characteristic analyzing function 754 may generate the patient characteristic information, which shows the mental aspects and the social aspects, but is not limited to generate the information for all of the biological aspects, the mental aspects, the social aspects, and the other aspects of the patient.

The medical-practice-event determining function 755 determines to which medical-practice event (s) of the medical-practice-event information 742 the medical-practice event corresponds based on the patient information, which has been obtained by monitoring the patient, such as the electronic medical-record information 11, the radiogram-interpretation-report information 21, the image information 31, the clinical-test-result information 41, the clinical-test-report information 42, and the personal health information 61. The medical practice events are, for example, "FIRST VISIT", "EXTENSIVE TESTING", "DISCLOSURE", "TREATMENT START" "TREATMENT UNDERWAY", "MEDICATION CHANGE", "TREATMENT END", "TREATMENT CANCELLATION", AND "TERMINAL PHASE".

The medical-practice event "FIRST VISIT" is a medical-practice event which means first medical attention. If there is no medical attention record of a clinical department (s) registered in the electronic medical-record information 11 within a set period from present time, the medical-practice-event determining function 755 determines that the medical-practice event corresponds to "FIRST VISIT". For example, even if the patient has visited the same clinical department in the past, if there is no medical attention record within the set period from the last day of visit, the medical-practice-event determining function 755 determines that the medical-practice event corresponds to "FIRST VISIT". Also, when medical practice is recorded for the first time, the medical-practice-event determining function 755 determines that the medical-practice event corresponds to "FIRST VISIT".

The medical-practice event "EXTENSIVE TESTING" is a medical-practice event which means that extensive testing such as image diagnosis or a clinical test is being carried out. If test order information is present, the medical-practice-event determining function 755 determines that the medical-practice event corresponds to "EXTENSIVE TESTING".

The medical-practice event "DISCLOSURE" is a state in which the patient is notified of an uncomfortable thing. The medical-practice-event determining function 755 determines if there is test order information, if there is a history that shows a test (s) has been carried out, and if there is the clinical-test-report information 42 or the radiogram-interpretation-report information 21 or not. Then, the medical-practice-event determining function 755 determines whether the medical-practice event corresponds to "DISCLOSURE" or not by analyzing the clinical-test-report information 42 or the radiogram-interpretation-report information 21. For example, the medical-practice-event determining function 755 executes natural language processing with respect to the clinical-test-report information 42. Then, if there is a term that means cancer or a term(s) such as malignant or suspected to be malignant which particularly needs attention, the medical-practice-event determining function 755 determines that the medical-practice event corresponds to "DISCLOSURE". Also, if the radiogram-interpretation-report information 21 includes the information which means metastasis lesion, the medical-practice-event determining function 755 determines that the medical-practice event corresponds to "DISCLOSURE". For example, in a case of a breast cancer patient, also when it is pointed out that a shadow (s) assumed to be a cancer is present in the breast in the opposite side of the breast with cancer or in another organ (s) other than the breasts, the medical-practice-event determining function 755 determines that the medical-practice event corresponds to "DISCLOSURE".

The medical-practice event "TREATMENT START" is a medical-practice event which means that it is the first treatment for an injury/disease. Also, the medical-practice event "TREATMENT UNDERWAY" is a medical-practice event which means that it is the second or subsequent treatment for the injury/disease. For example, the medical-practice-event determining function 755 determines whether the medical-practice event corresponds to "TREATMENT START" OR "TREATMENT UNDERWAY" based on the number of times medical treatment has been instructed or the number of times of medical attention appointments with a radiation treatment department.

The medical-practice event "MEDICINE CHANGE" is a medical-practice event which means that the medicine administered to the patient has been changed. The medical-practice event "TREATMENT CANCELLATION" is a medical-practice event which means that the treatment for the patient has been cancelled. For example, the medical-practice-event determining function 755 determines whether the medical-practice event corresponds to "MEDICINE CHANGE" OR "TREATMENT CANCELLATION" based on Common Terminology Criteria for Adverse Events (CT-CAE) grade information, patient outcome report information, blood-test result information, etc. described in the electronic medical-record information 11 or nursing reports. Also, the medical-practice-event determining function 755 determines whether the medical-practice event corresponds to "MEDICINE CHANGE" OR "TREATMENT CANCELLATION" based on differences in blood marker reference values such as a white blood cell count, neutropenia, etc. in blood tests carried out while medication treatment or radiation therapy is carried out.

The medical-practice event "TREATMENT END" is a medical-practice event which means that the treatment of the patient has ended. For example, the medical-practice-event determining function 755 determines whether the medical-practice event corresponds to "TREATMENT END" or not based on the standard number of times of treatment included in the electronic medical-record information 11. For example, the medical-practice-event determining function 755 determines whether the event corresponds to "TREATMENT END" based on the number of times medication treatment has been instructed. The number of times of radiation treatment after conserving treatment of breast cancer is 25 as a standard number of times of treatment. Therefore, the medical-practice-event determining function 755 may determine whether the medical-practice event corresponds to "TREATMENT END" based on the number of times of medical attention appointments with a radiation treatment department.

The medical-practice event "TERMINAL PHASE" is a medical-practice event which means that the injury/disease is not expected to be healed and the treatment has been cancelled or a transition only to palliative medical care has been made. For example, when metastasis lesion has been detected from the electronic medical-record information 11 and "TREATMENT CANCELLATION" has been applied or when switching to pain relief treatment only has been made, the medical-practice-event determining function 755 determines whether the medical-practice event corresponds to "TERMINAL PHASE".

The support determining function 756 determines whether the request conditions set with respect to the medical-practice events have been satisfied or not based on the patient characteristic information. Herein, supporters are specialists who support the medical workers in response to support requests. Note that the supporters are typically specialists, but are not required to be specialists.

For example, a request condition "DEPRESSIVE STATE" is set in the support request information 743 with respect to the medical-practice event "TREATMENT UNDERWAY". If the medical-practice-event determining function 755 has determined the medical-practice event is the medical-practice event "TREATMENT UNDERWAY" and if the patient is determined to be in "DEPRESSIVE STATE" according to the patient characteristic information, the support determining function 756 determines that the request conditions are satisfied.

For example, the request condition "RETIRED" is set in the support request information 743 with respect to the medical-practice event "EXTENSIVE TESTING". If the medical-practice-event determining function 755 has determined that the medical-practice event is the medical-practice event "EXTENSIVE TESTING" and if the patient has been determined to have "RETIRED" according to the patient characteristic information, the support determining function 756 determines that the request conditions have been satisfied. Note that the request condition "RETIRED" is not limited to the medical-practice event "EXTENSIVE TESTING", but may be set for another medical-practice event (s).

For example, a request condition "INTROVERSIVE" is set in the support request information 743 with respect to the medical-practice event "DISCLOSURE". If the medical-practice-event determining function 755 has determined that the medical-practice event is the medical-practice event "DISCLOSURE" and if the patient has been determined to be "introversive" according to the patient characteristic information, the support determining function 756 determines that the request conditions have been satisfied.

In some cases, the medical-practice-event determining function 755 determines that the medical-practice event corresponds to plural medical-practice events. For example, in some cases, the medical-practice-event determining function 755 determines that the medical-practice event is "TREATMENT UNDERWAY" and "MEDICATION CHANGE". In more detail, the support determining function 756 determines which medical-practice event is to be prioritized based on the importance degrees of the medical-practice events in the medical-practice-event information 742. For example, the support determining function 756 selects one medical-practice event based on the importance degrees of the medical-practice-event information 742. Then, the support determining function 756 determines whether the request conditions set with respect to the medical-practice event to be prioritized have been satisfied or not based on the patient characteristic information. Note that, if the medical-practice-event information 742 does not have the importance degrees, the support determining function 756 determines whether the request conditions set with respect to each of the medical-practice events have been satisfied or not.

The supporter identifying function 757 determines at least one supporter whom support is to be requested based on the patient characteristic information, the medical-practice events of the patient, and the request conditions for requesting support in the medical-practice events. The supporter identifying function 757 is an example of a determination unit. In more detail, based on the support request information 743, the supporter identifying function 757 determines the specialist, who is associated with the request conditions which have been determined by the support determining function 756 to be satisfied, as at least one supporter whom support is to be requested.

Also, when which medical-practice event is to be prioritized has been determined by the medical-practice-event determining function 755 based on the importance degrees of the medical-practice events, the supporter identifying function 757 determines at least one supporter whom support is to be requested based on the patient characteristic information, the medical-practice events, the importance degrees of the medical-practice events, and the request conditions. In other words, the supporter identifying function 757 determines the specialist, who is associated with the request conditions, as the supporter.

The information generating function 758 generates the information which is to be displayed on the display device 80. Then, the display device 80 displays the various information generated by the information generating function 758. For example, the information generating function 758 generates the medical-practice-plan screen G1, which shows a medical practice plan of the patient. Then, the display device 80 displays the medical-practice-plan screen G1, which has been generated by the information generating function 758.

FIG. 6 is an explanatory diagram illustrating an example of the medical-practice-plan screen G1 according to the present embodiment. The medical-practice-plan screen G1 has patient profile information G11, schedule information G12, and vital signs information G13. The patient profile information G11 is the information which shows a profile of the patient. For example, the patient profile information G11 is the information which shows the name of the patient, the date of birth of the patient, the blood type of the patient, the body height of the patient, the body weight of the patient, etc. The vital signs information G13 is the information which shows the vital signs of each of the days shown in the schedule information G12.

The schedule information G12 is the information which shows a plan of medical practice. The schedule information G12 shows medical practice appointments, which show appointments of medical practice, and medical-practice events of respective days. If the support determining function 756 determines that the request conditions have been satisfied, the information generating function 758 provides a supporter request button G14 with respect to the medical-practice event. The supporter request button G14 is a button which causes supporter request information G15, which shows a supporter (s) whom support is to be requested, to be displayed. Note that the information generating function 758 may automatically present the supporter request information G15 even if the supporter request button G14 is not pressed. For example, when the medical-practice-plan screen G1 is to be presented, the information generating function 758 may present the supporter request information G15 on condition that the support determining function 756 has determined that the request conditions have been satisfied. In other words, the information generating function 758 generates the supporter request information G15, which includes the information related to the supporter determined by the supporter identifying function 757. The information generating function 758 is an example of an information generating unit. Thus, the information generating function 758 generates the supporter request information G15 which shows the supporter whom support is to be requested.

Also, the supporter request button G14 is associated with the timing when the request conditions of the medical-practice event have been determined to be satisfied. In other words, the information generating function 758 generates the supporter request information G15, which includes the information related to the supporter, in association with the timing when the request conditions have been determined to be satisfied. By virtue of this, the medical worker can find out which timing to request support.

When the supporter request button G14 is pressed, the information generating function 758 generates the supporter request information G15. The supporter request information G15 is the information which requests support from the supporter. The supporter request information G15 has message information G151, supporter list information G152, and a support asking button G153.

The message information G151 is the information which shows the medical-practice event, which has been determined to satisfy the request conditions, and the timing of the medical-practice event. The information generating function 758 generates the message information G151 based on the medical-practice event, which has been determined by the support determining function 756 to have satisfied the request conditions, and the timing of the medical-practice event.

The supporter list information G152 is the information for selecting the supporter whom support is to be requested. The information generating function 758 generates the supporter list information G152, which is a list of the supporters identified by the supporter identifying function 757. Herein, based on the support request information 743, the supporter identifying function 757 identifies the supporter from a list of the supporters registered with respect to the request conditions. In other words, the information generating function 758 generates the supporter list information G152 for selecting the supporter whom support is to be requested among the supporters registered with respect to the request conditions. The supporter list information G152 has a check box for each of the supporters. The support asking button G153 is a button which requests support from the supporter selected by the check box of the supporter list information G152.

Also, the information generating function 758 generates the supporter list information G152, which shows the list of the supporters whom support is to be requested, based on the priorities of the supporters in the support request information 743. For example, the information generating function 758 generates the supporter list information G152, in which the supporters are arranged in the order corresponding to the priorities of the supporters. By virtue of this, the medical worker can find out which supporter is a more important supporter. Note that, if the support request information 743 does not have the priorities, the information generating function 758 may generate the supporter list information G152 which shows a list of relevant supporters. In other words, the information generating function 758 may generate the supporter list information G152 in which the supporters are not arranged in the order corresponding to the priorities.

The operation inputting function 759 receives various operations. For example, the operation inputting function 759 receives an operation of selecting the supporter in the supporter request information G15. The operation inputting function 759 is an example of an input unit. Also, the operation inputting function 759 receives an operation of pressing the support asking button G153 in the supporter request information G15. In other words, the operation inputting function 759 receives the operation of pressing the support asking button G153, for example, from the display device 80.

The support requesting function 760 notifies the supporter, who has been selected by the operation inputting function 759 in the supporter request information G15, of the support request. The support requesting function 760 is an example of a notification unit. For example, the support requesting function 760 carries out the notification of the support request by transmitting a mail, which is asking for support, to a terminal of the supporter. Also, the support requesting function 760 carries out the notification of the support request by registering a plan of requesting the support in a schedule of the supporter. Note that these support requesting methods are examples, and the support requesting function 760 may request the support by any method.

The setting function 761 sets various information with respect to the medical-practice-event information 742 and the support request information 743. For example, the setting function 761 sets the importance degrees of the medical-practice events in the medical-practice-event information 742. The setting function 761 is an example of a first setting unit. Also, the setting function 761 sets the priorities of the specialists who serve as the supporters in the support request information 743. The setting function 761 is an example of a second setting unit. The setting function 761 is not limited to set the importance degrees and the priorities, but may also set the request conditions and the specialists with respect to the medical-practice events of the support request information 743. Also, the setting function 761 executes addition and/or deletion of the medical-practice events with respect to the medical-practice-event information 742 and the support request information 743. By virtue of this, the setting function 761 can set the importance degrees and the priorities arbitrarily for each facility such as a hospital.

The support determining function 756 may estimate the timing when the request conditions can be satisfied based on the patient characteristic information. For example, if the patient is hoping to have a baby, the support determining function 756 finds out the menstrual cycles based on the patient characteristic information. Then, the support determining function 756 estimates the timing when the request conditions are satisfied by the menstrual cycles. By virtue of this, the support determining function 756 can determine appropriate request timing.

Also, the setting function 761 may set a request condition "EMOTION MORE NEGATIVE THAN THRESHOLD VALUE" with respect to all the medical-practice events. As a result, if the emotion value which is quantified negative emotion of the patient is lower than the threshold value, the support determining function 756 determines that the request condition "EMOTION MORE NEGATIVE THAN THRESHOLD VALUE" has been satisfied and determines that the request condition has been satisfied based on the patient characteristic information. As a result, the information generating function 758 generates the supporter request information G15 which shows the supporter who is a specialist other than a primary doctor of the patient and whom support is to be requested. For example, the information generating function 758 generates the supporter request information G15 which shows supporters such as psycho-oncology psychiatrists, clinical psychotherapists, cancer counselors, and cancer nurses. Therefore, the medical worker can request the specialists who are other than the primary doctor for support.

Next, various processing executed by the clinical support system 1 will be described.

FIG. 7 is a flow chart illustrating an example of a support requesting process executed by the clinical support apparatus 70 according to the present embodiment. The support requesting process is a process of requesting support from the supporter.

The patient specifying function 751 receives specifying of a patient to be a target of the medical-practice-plan screen G1 (step S1).

The information acquiring function 752 acquires the patient information such as the electronic medical-record information 11, the radiogram-interpretation-report information 21, the image information 31, the clinical-test-result information 41, the clinical-test-report information 42, the personal health information 61, and the like (step S2).

The information acquiring function 752 acquires the interview information 12 (step S3).

The information acquiring function 752 acquires the conversation information 51 (step S4).

The characteristic analyzing function 754 generates the patient characteristic information which shows the biological aspects, the mental aspects, the social aspects, and other aspects of the patient by an analyzing process using the patient information, the interview information 12, and the conversation information 51 (step S5).

The clinical support apparatus 70 executes a later-described supporter determining process (step S6).

The information generating function 758 generates the medical-practice-plan screen G1 (step S7). Then, the information generating function 758 transmits the generated medical-practice-plan screen G1 to the display device 80 (step S8). As a result, the display device 80 displays the medical-practice-plan screen G1.

The support requesting function 760 determines whether an operation of requesting the supporter for support has been received or not in the medical-practice-plan screen G1 displayed on the display device 80 (step S9). If there is no support request (step S9; No), the support requesting function 760 ends the support requesting process.

If the support request is present (step S9; Yes), the support requesting function 760 requests the supporter for support (step S10).

Thus, the clinical support apparatus 70 ends the support requesting process.

Figure 8:
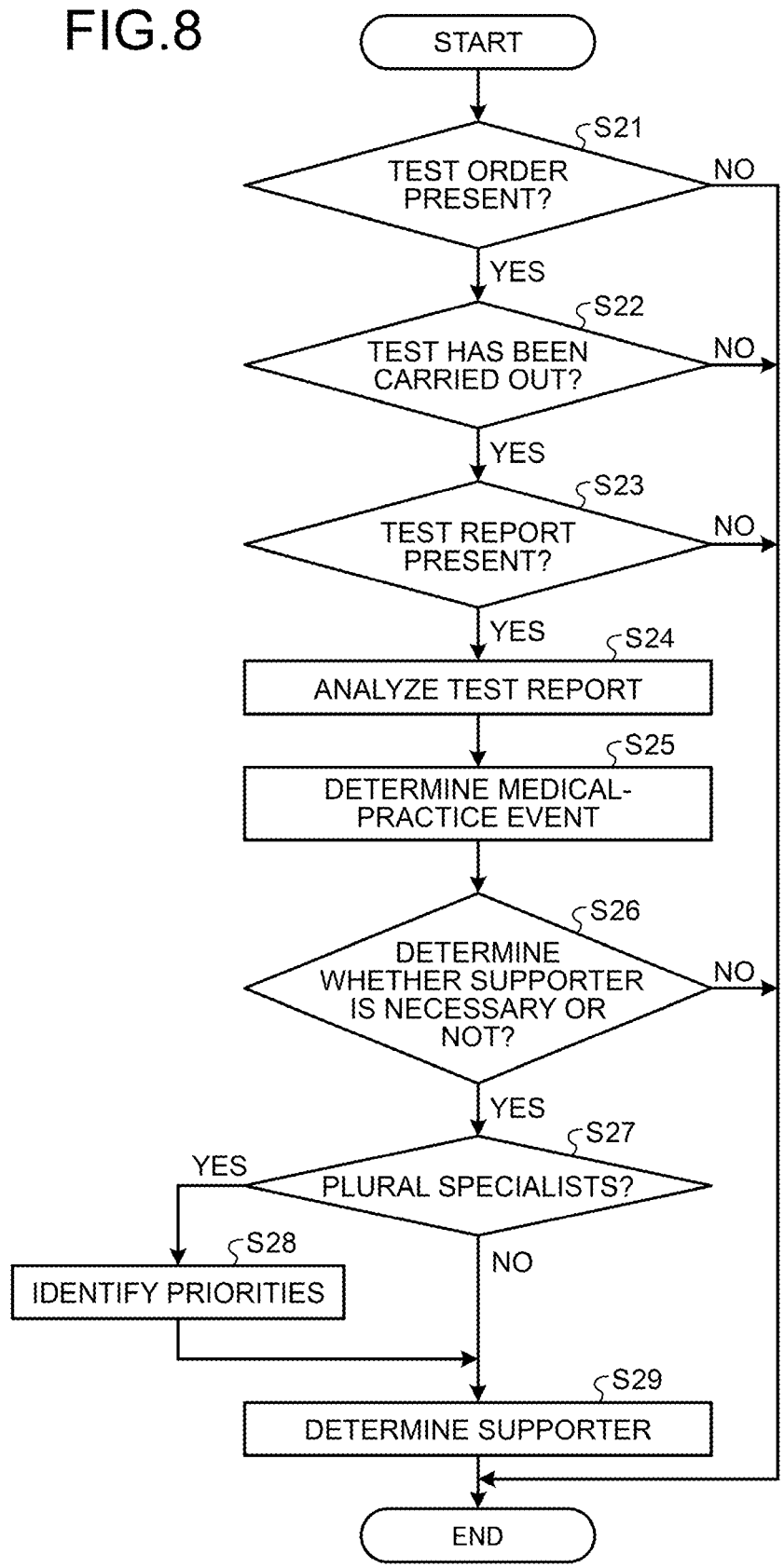
FIG. 8 is a flow chart illustrating an example of a support determining process executed by the clinical support apparatus according to the present embodiment.

FIG. 8 is a flow chart illustrating an example of a supporter determining process executed by the clinical support apparatus 70 according to the present embodiment. The supporter determining process is a process of determining whether to request the supporter for support or not. Note that the supporter determining process illustrated in FIG. 8 is a process of determining whether the medical-practice event corresponds to the medical-practice event "DISCLOSURE" or not based on the clinical-test-report information 42 and the radiogram-interpretation-report information 21.

The medical-practice-event determining function 755 determines whether there is a test order (s) such as a clinical test order or an image diagnosis order (step S21). If there is no test order (step S21; No), the clinical support apparatus 70 ends a support determining process.

If there is the test order (step S21; Yes), the medical-practice-event determining function 755 determines whether the test asked by the test order has already been carried out or not (step S22). If the test has not been carried out (step S22; No), the clinical support apparatus 70 ends the support determining process.

If the test has been carried out (step S22; Yes), the medical-practice-event determining function 755 determines whether a test report (s) such as the clinical-test-report information 42 or the radiogram-interpretation-report information 21 is present or not (step S23). If there is no test report (step S23; No), the clinical support apparatus 70 ends the support determining process.

If the test report is present (step S23; Yes), the medical-practice-event determining function 755 analyzes the test report (step S24).

The medical-practice-event determining function 755 determines the medical-practice event based on the analysis result with respect to the test report (step S25). In the supporter determining process illustrated in FIG. 8, whether the medical-practice event corresponds to the medical-practice event "DISCLOSURE" or not is determined.

The support determining function 756 determines whether a supporter (s) is necessary or not based on the patient characteristic information and the medical-practice event of the patient (step S26). In other words, the support determining function 756 determines whether the request conditions, which are set with respect to the medical-practice event, have been satisfied or not based on the patient characteristic information. If it is determined that the supporter is not necessary (step S26; No), the clinical support apparatus 70 ends the support determining process.

If it is determined that the supporter is necessary (step S26; Yes), the supporter identifying function 757 determines whether there are plural specialists identified by the request conditions, which are set with respect to the medical-practice events, or not based on the support request information 743 (step S27).

If the plural specialists are not present (step S27; No), the clinical support apparatus 70 makes a transition to step S29.

If the plural specialists are present (step S27; Yes), the information generating function 758 identifies the priorities of the specialists based on the support request information 743 (step S28). As a result, for example, the information generating function 758 generates the supporter request information G15, which allows selection of the specialist (s), whom support is to be requested, by the priority order shown by the priorities.

Based on the support request information 743, the supporter identifying function 757 determines the specialist (s), who is identified by the request conditions set with respect to the medical-practice event, as the supporter (s) whom support is to be requested (step S29).

Thus, the clinical support apparatus 70 ends the support determining process.

In the above described manner, the clinical support system 1 according to the present embodiment acquires the patient information, the interview information 12, and the conversation information 51 related to the patient. Also, the clinical support system 1 generates the patient characteristic information, which shows the mental aspects and the social aspects of the patient, by the analyzing process using the patient information, the interview information 12, and the conversation information 51. Also, the clinical support system 1 determines the supporter (s) whom support is to be requested based on the patient characteristic information, the medical-practice event of the patient determined by the medical-practice-event determining function 755, and the request conditions set by the support request information 743. Then, the clinical support system 1 displays the medical-practice-plan screen G1, which requests support, when it is determined that the request conditions are satisfied. By virtue of this, the medical worker can consider whether to request the specialist (s) for support or not. Therefore, the clinical support system 1 can support the medical worker to determine whether to request the specialist (s) for support or not.

Furthermore, the clinical support system 1 enables the medical worker to request the specialist (s), who is suitable for each patient, for support at the timing suitable for the patient. Therefore, the medical worker can reduce his/her own burden and holistic and good medical care can be provided to the patient by the supporter (s).

Modification Example 1

In the present embodiment, it has been described that the information acquiring function 752 acquires the patient information, the interview information 12, and the conversation information 51. Furthermore, the information acquiring function 752 may acquire location information from the patient terminal 50, may acquire brain-wave information from the patient measurement terminal 60, or may acquire both of the information.

The location information is the information which shows the location of the patient terminal 50. In other words, the location information is the information which shows the location of the patient. The characteristic analyzing function 754 can extract commuting time, for example, by measuring the travel time from the home of the patient to his/her workplace based on the location information and map information at corresponding time. By a similar method, the characteristic analyzing function 754 can extract the time taken to visit the hospital. Furthermore, the characteristic analyzing function 754 can extract, for example, if the patient is active or if the patient tends to retreat at home based on the location information.

The brain-wave information is the information which shows the brain waves of the patient. For example, the information acquiring function 752 acquires the brain-wave information which shows the brain waves of the patient during conversations with the medical worker. By virtue of this, the characteristic analyzing function 754 can acquire the mental conditions of the patient during the conversations with the medical worker. For example, the characteristic analyzing function 754 can extract, for example, a fact about whether the patient is relaxed or is feeling stressed.

By virtue of this, the characteristic analyzing function 754 can analyze the patient in more detail. Therefore, the clinical support apparatus 70 can determine in more detail whether support is to be requested or not.

Modification Example 2

In the present embodiment, the information generating function 758 generates the medical-practice-plan screen G1. Also, it has been described that the display device 80 displays the medical-practice-plan screen G1. The information generating function 758 may display the medical-practice-plan screen G1 on the display 730 of the clinical support apparatus 70 or on another device.

Modification Example 3

When the supporter is requested for support, the medical worker informs the supporter of the information necessary for advancing treatment or care based on the mental aspects and the social aspects of the patient in addition to the biological aspects. Since the supporter is informed, the supporter can carry out the support appropriate for the mental aspects and the social aspects of the patient. Therefore, the information generating function 758 is not limited to generate the medical-practice-plan screen G1, but may generate a screen in which the mental aspects and the social aspects of the patient are categorized by the will of the patient, peripheral matters, Quality of Life (QOL), etc. Then, the display device 80 may display the screen generated by the information generating function 758.

Herein, the characteristic analyzing function 754 generates the patient characteristic information, which shows the biological aspects, the mental aspects, the social aspects, and other aspects of the patient, by an analyzing process using the patient information, the interview information 12, and the conversation information 51. Furthermore, the characteristic analyzing function 754 may categorize the information of the biological aspects, the mental aspects, the social aspects, and the other aspects included in the patient characteristic information into the items determined in advance. Also, the characteristic analyzing function 754 may categorize the information of the biological aspects, the mental aspects, and the social aspects included in the patient characteristic information, for example, into the will of the patient, peripheral matters, QOL, etc. In other words, the characteristic analyzing function 754 may generate the patient characteristic information in which the mental aspects and the social aspects of the patient are categorized by category items determined in advance. Furthermore, the characteristic analyzing function 754 may categorize the category items such as the will of the patient, peripheral matters, QOL, etc. gradually, for example, into a large category, a middle category, and a small category.

Figure 9:
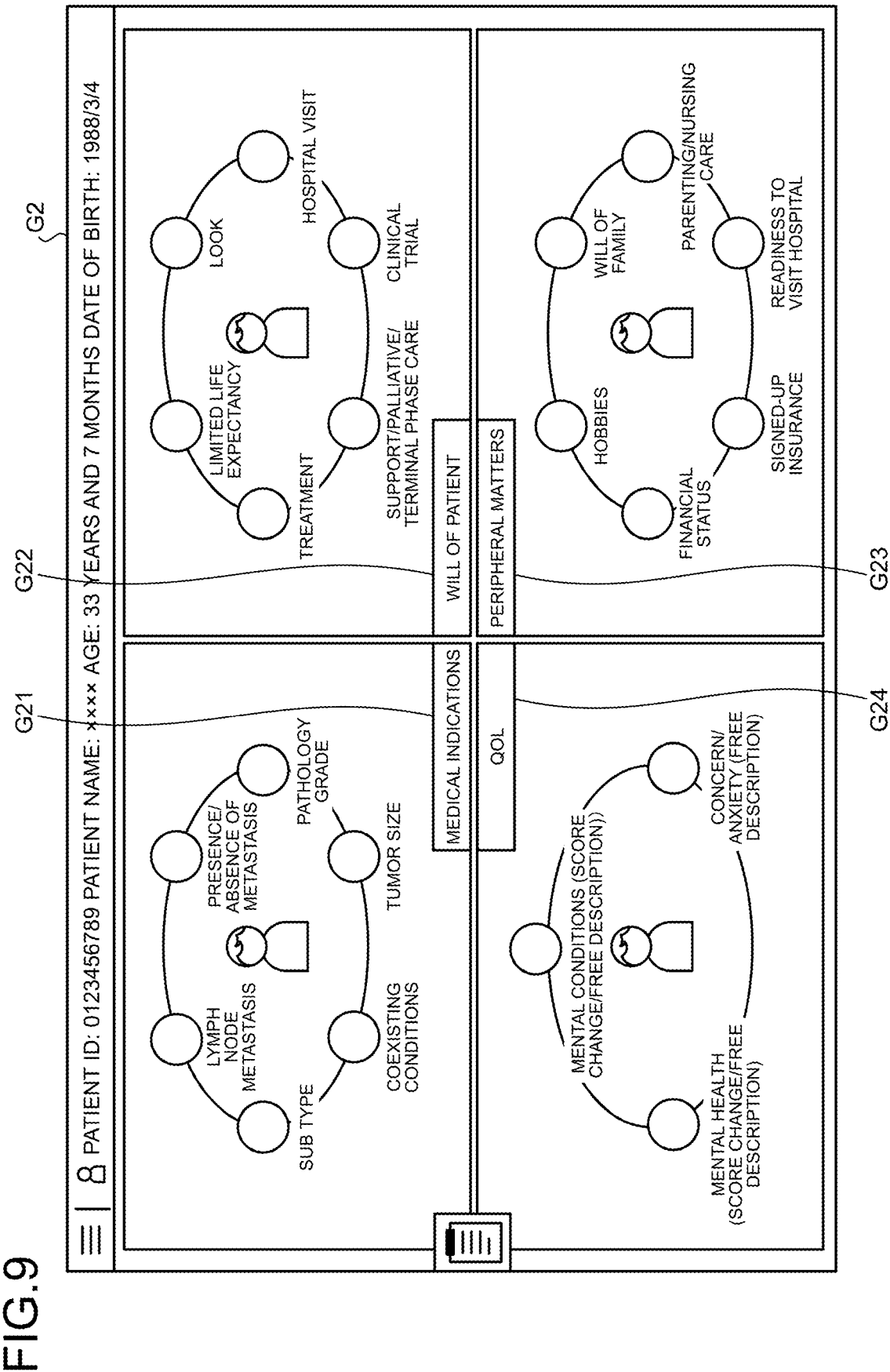
FIG. 9 is a diagram illustrating an example of a first category screen illustrating category items including a middle category according to Modification Example 3.

The information generating function 758 generates a screen which displays the patient characteristic information gradually by the large category, middle category, and small category regarding the will of the patient, peripheral matters, and QOL. FIG. 9 is a diagram illustrating an example of a first category screen G2 showing category items including the middle category according to Modification Example 3. The first category screen G2 has display areas which display category items of the middle category of medical indications, the will of the patient, peripheral matters, and QOL. The display areas may display all of the category items of the middle category or may display, among the category items of the middle category, the items which are associated with the information included in the patient characteristic information.

Also, the first category screen G2 has a medical-indication button G21, a patient-will button G22, a peripheral-matter button G23, and a QOL button G24. The medical-indication button G21, the patient-will button G22, the peripheral-matter button G23, and the QOL button G24 are buttons which receive operation for displaying a second category screen G3 (see FIG. 10), which shows category items including the small category included in the corresponding large category.

Figure 10:
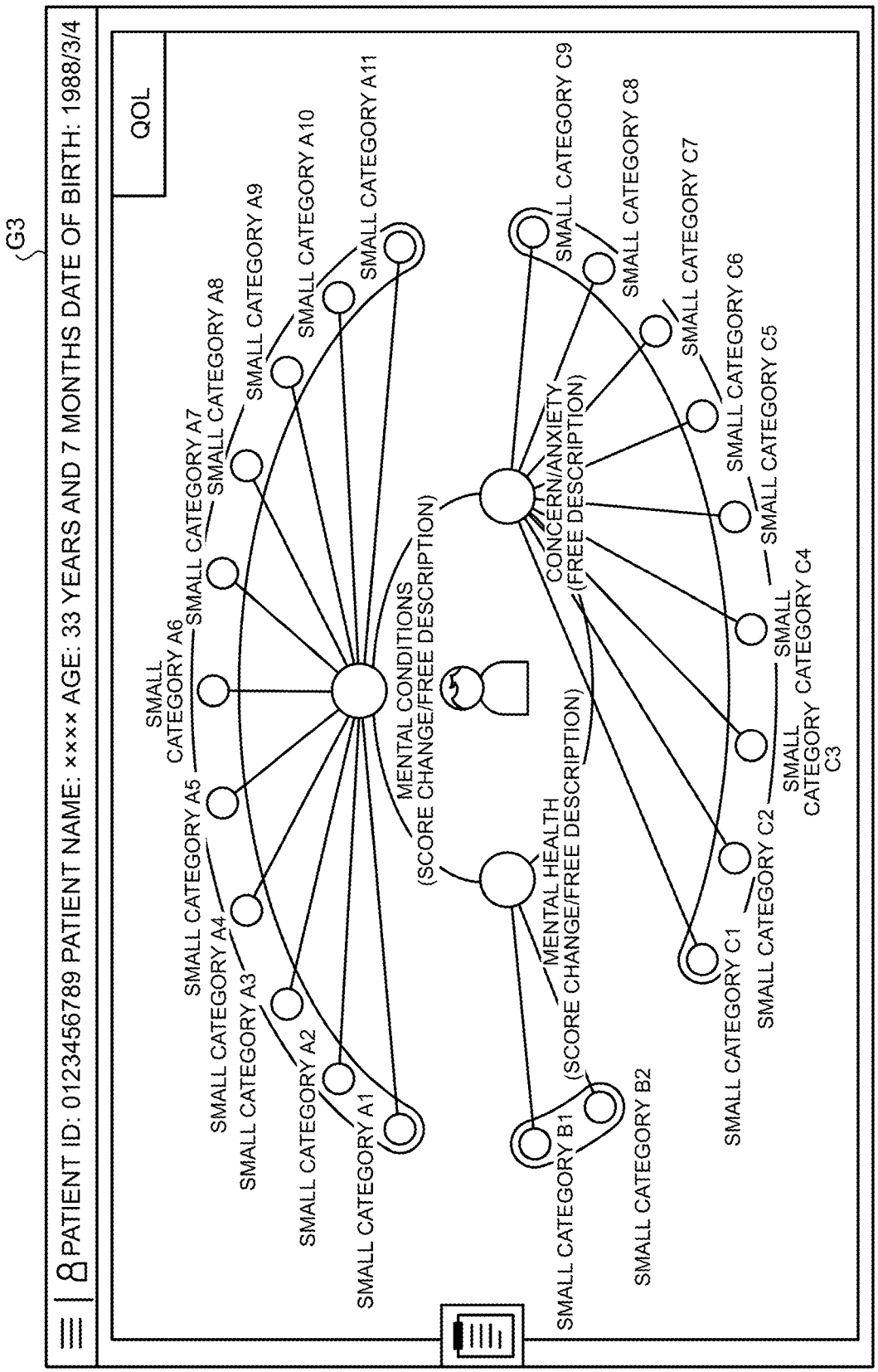
FIG. 10 is a diagram illustrating an example of a second category screen according to Modification Example 3.

When any of the medical-indication button G21, the patient-will button G22, the peripheral-matter button G23, and the QOL button G24 is selected, the information generating function 758 generates the second category screen G3 of the corresponding large category. FIG. 10 is a diagram illustrating an example of the second category screen G3 according to Modification Example 3. The second category screen G3 has category items of the small category outside the category items of the middle category. The category items of the middle category and the category items of the small category are coupled by outgoing lines. By virtue of this, the second category screen G3 clearly shows the relations between the middle category and the small category and clearly shows to which category items of the middle category the category items of the small category belong. Also, when the category item of the small category is selected in the second category screen G3, the information generating function 758 may display detailed information of the selected category item of the small category. Then, the display device 80 generates screens such as the first category screen G2, the second category screen G3, etc. showing the mental aspects and the social aspects of the patient by the category items based on the patient characteristic information.

In this manner, the information generating function 758 generates the first category screen G2 and the second category screen G3 as the screens in which the patient characteristic information including the mental aspects and the social aspects of the patient is categorized by the medical indications, the will of the patient, the peripheral matters, QOL, etc. Then, the display device 80 displays the first category screen G2 and the second category screen G3. Therefore, the supporter can carry out the support suitable for the patient in consideration of the mental aspects and the social aspects of the patient in addition to the biological aspects. Therefore, the information generating function 758 can carry out support to advance medical care in consideration of the mental aspects and the mental aspects in addition to the biological aspects.

According to the at least one embodiment, etc. described above, the determination whether to request a specialist (s) for support or not can be supported.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A clinical support system comprising:
a clinical support apparatus having processing circuitry;
a display device; and
a patient terminal storing conversation information recording a conversation of a patient, wherein
the processing circuitry is configured to:
acquire patient information related to a patient, and interview information showing a response detail of the patient with respect to an interview, and electrically receive the conversation information from the patient terminal,
receive specifying of an analysis target item among analysis items for a mental aspect and a social aspect, the analysis target item being a target item to be analyzed for the patient,
generate patient characteristic information, showing an analysis result of the analysis target item among the mental aspect and the social aspect of the patient by an analyzing process using the patient information, the interview information, and the conversation information, the characteristic information including emotion information, and the emotion information being generated using a learned model trained with conversation information training data and emotion information training data, and determine, at least one supporter based on the patient characteristic information, a medical-practice event of the patient, a request condition for requesting support in the medical-practice event, and a priority for each specialist, at least one specialist associated with the request condition as at least one supporter who is being to be requested for the support, and the display device displays a screen including a list of the determined at least one supporter arranged in an order of the priority and a button for requesting support from a selected supporter in the list, and information related to the determined at least one supporter, and registers a plan of requesting the support in a schedule of the selected supporter, when the button is pressed.

2. The clinical support system according to claim 1, wherein the display device displays information requesting the supporter for the support.

3. The clinical support system according to claim 1, wherein the display device displays information including the information related to the supporter, the information being displayed in association with timing when the request condition is determined to be satisfied.

4. The clinical support system according to claim 1, wherein the display device displays information for selecting the supporter to be requested for the support among the supporters registered with respect to the request condition.

5. The clinical support system according to claim 1, wherein the processing circuitry configured to generate the patient characteristic information categorized by a category item determined in advance for the mental aspect and the social aspect of the patient, and the display device displays the mental aspect and the social aspect of the patient by the category item based on the patient characteristic information.

6. The clinical support system according to claim 1, wherein the processing circuitry configured to determine the at least one supporter based on the patient characteristic information, the medical-practice event, an importance degree of the medical-practice event, and the request condition, the supporter being to be requested for the support.

7. The clinical support system according to claim 6, wherein the processing circuitry configured to set the importance degree of the medical-practice event.

8. The clinical support system according to claim 1, wherein the display device displays a list of the supporters based on a priority of the supporter, the supporter being to be requested for the support.

9. The clinical support system according to claim 8, wherein the processing circuitry configured to set the priority of the supporter.

10. The clinical support system according to claim 1, wherein the processing circuitry configured to:

receive input that selects the supporter to be requested for the support, and notify the selected supporter of a support request.

11. The clinical support system according to claim 1, wherein the learned model is trained using the conversation information training data as input-side training data and the emotion information training data and output-side training data.

12. The clinical support system according to claim 1, wherein the emotion information comprises emotions of the patient in the conversation information.

13. The clinical support system according to claim 1, wherein the processing circuitry is further configured to determine whether a supporter is needed based upon the characteristic information.

14. The clinical support system according to claim 13, wherein the processing circuitry is configured to generate category screens including linking information linking different categories.

15. The clinical support system according to claim 1, by at least one of medical indications, will of the patient, quality of life and patient peripheral matters.

16. A clinical support apparatus comprising processing circuitry, wherein the processing circuitry is configured to:

acquire patient information related to a patient, and interview information showing a response detail of the patient with respect to an interview, electrically receive conversation information recording a conversation of the patient from a patient terminal storing the conversation information, receive specifying of an analysis target item among analysis items for a mental aspect and a social aspect, the analysis target item being a target item to be analyzed for the patient, generate patient characteristic information showing an analysis result of the analysis target item among the mental aspect and the social aspect of the patient by an analyzing process using the patient information, the interview information, and the conversation information, the characteristic information including emotion information, and the emotion information being generated using a learned model trained with conversation information training data and emotion information training data, determine at least one supporter based on the patient characteristic information, a medical-practice event of the patient, a request condition for requesting support in the medical-practice event, and a priority for each specialist, at least one specialist associated with the request condition as at least one supporter who is being to be requested for the support, generate a screen including a list of the determined at least one supporter arranged in an order of the priority and a button for requesting support from a selected supporter in the list, and information related to the determined at least one supporter, and register a plan of requesting the support in a schedule of the selected supporter, when the button is pressed.

* * * * *